US010977598B1

(12) United States Patent
Peng (10) Patent No.: US 10,977,598 B1
(45) Date of Patent: Apr. 13, 2021

(54) TASK DELEGATION SYSTEM THAT TRANSPARENTLY AND CONSTRUCTIVELY REWARDS TIMELY AND ACCURATE COMPLETION OF TASKS TO INCREASE PRODUCTIVITY AND MORALE OF WORKERS

(71) Applicant: Noel Peng, Plano, TX (US)

(72) Inventor: Noel Peng, Plano, TX (US)

( * ) Notice: Subject to any disclaimer, the term of this patent is extended or adjusted under 35 U.S.C. 154(b) by 522 days.

(21) Appl. No.: 15/492,966

(22) Filed: Apr. 20, 2017

Related U.S. Application Data (63) Continuation-in-part of application No. 14/197,115, filed on Mar. 4, 2014, now abandoned.
(60) Provisional application No. 61/773,583, filed on Mar. 6, 2013.

(51) Int. Cl.
*G06Q 10/00* (2012.01)
*G06Q 10/06* (2012.01)
*G06Q 10/10* (2012.01)

(52) U.S. Cl.
CPC ........... *G06Q 10/06398* (2013.01); *G06Q 10/063114* (2013.01); *G06Q 10/109* (2013.01)

(58) Field of Classification Search
None
See application file for complete search history.

(56) References Cited

U.S. PATENT DOCUMENTS

| | | | | |
|---|---|---|---|---|
| 8,190,468 B1* | 5/2012 | Drew | ............... | G06Q 10/06398 705/7.42 |
| 10,339,550 B2* | 7/2019 | Rao | .................... | G06Q 30/0207 |
| 2004/0098447 A1* | 5/2004 | Verbeke | ................ | G06F 9/5055 709/201 |
| 2004/0268349 A1* | 12/2004 | Ramakrishnan | ....... | G06Q 10/10 718/100 |
| 2006/0136495 A1* | 6/2006 | Schaad | ............ | G06Q 10/06316 |
| 2006/0288346 A1* | 12/2006 | Santos | .................. | G06F 9/5038 718/102 |
| 2008/0270240 A1* | 10/2008 | Chu | .................... | G06Q 30/0239 705/14.11 |
| 2011/0231218 A1* | 9/2011 | Tovar | ............. | G06Q 10/063114 705/7.15 |
| 2011/0288900 A1* | 11/2011 | McQueen | ...... | G06Q 10/063116 705/7.16 |
| 2011/0320230 A1* | 12/2011 | Podgurny | .............. | G06Q 50/30 705/7.13 |
| 2012/0110087 A1* | 5/2012 | Culver | ................. | G06Q 10/067 709/205 |

(Continued)

OTHER PUBLICATIONS

Mergenthal, Karola, Sharing Responsibilities within the General Practice Team—A Cross-Sectional Study of Task Delegation in Germany, Jun. 9, 2016, PMC, https://www.ncbi.nlm.nih.gov/pmc/articles/PMC4900540/, p. 1-14.*

*Primary Examiner* — Joseph M Waesco
(74) *Attorney, Agent, or Firm* — Plager Schack LLP; Mark H. Plager; Stephen Hallberg (57) ABSTRACT

A system is disclosed to increase productivity and morale by delegating clearly defined tasks and rewarding timely completion of tasks positively with points/scores/advancements, which is constructive and transparent. In some embodiments, the system creates a rewarding, friendly competitive, and fun environment and culture to encourage timely completion of tasks with constructive, transparent feedback.

12 Claims, 7 Drawing Sheets

(56) References Cited

U.S. PATENT DOCUMENTS

| | | | | |
|---|---|---|---|---|
| 2012/0265574 | A1* | 10/2012 | Olding | G06Q 10/06 |
| | | | | 705/7.14 |
| 2012/0284073 | A1* | 11/2012 | Agarwal | G06Q 10/101 |
| | | | | 705/7.13 |
| 2013/0275803 | A1* | 10/2013 | Kern | G06F 40/20 |
| | | | | 714/15 |
| 2014/0006077 | A1* | 1/2014 | Davis | G06Q 10/06311 |
| | | | | 705/7.14 |
| 2014/0297348 | A1* | 10/2014 | Ellis | G06Q 10/063114 |
| | | | | 705/7.15 |
| 2014/0321633 | A1* | 10/2014 | Erhart | G06Q 10/063118 |
| | | | | 379/265.02 |

\* cited by examiner

TASK DELEGATION SYSTEM THAT TRANSPARENTLY AND CONSTRUCTIVELY REWARDS TIMELY AND ACCURATE COMPLETION OF TASKS TO INCREASE PRODUCTIVITY AND MORALE OF WORKERS

CLAIM OF BENEFIT TO PRIOR APPLICATION

This application is a continuation-in-part (CIP) application of and claims benefit to U.S. Non-Provisional patent application Ser. No. 14/197,115, entitled "Task Delegation System that Transparently and Constructively Rewards Timely and Accurate Completion of Tasks to Increase Productivity and Morale of Workers," filed Mar. 4, 2014, which claimed benefit to U.S. Provisional Patent Application 61/773,583, entitled "A system to increase productivity and morale by delegating clearly defined tasks and rewarding timely completion of tasks positively with points/scores/advancements, which are constructive and transparent," filed Mar. 6, 2013. The U.S. Non-Provisional patent application Ser. No. 14/197,115 is incorporated herein by reference.

BACKGROUND

Embodiments of the invention described in this specification relate generally to productivity systems, and more particularly, to task delegation and reward systems for increasing productivity and morale.

People have a tendency to procrastinate, forget about their responsibilities, or often are not sure about the details of their responsibilities even with supervision.

Past systems did not reward timely completion of tasks positively with points/scores/advancements, which are constructive and transparent.

Therefore, what is needed is a way to encourage timely completion of tasks with constructive, transparent feedback in a rewarding, friendly competitive, and fun environment/culture.

BRIEF DESCRIPTION

Some embodiments of the invention include novel systems and methods for delegating tasks in a way that increases productivity and morale of workers. In some embodiments, a method for delegating tasks includes transparently and constructively rewarding timely completion of tasks to increase the productivity and the morale of the workers. In some embodiments, the method rewards the timely completion of a set of tasks delegated to a worker by reinforcing a positive work environment and culture. In some embodiments, the method positively reinforces the work environment and culture by awarding task completion points, scores, or advancements.

In some embodiments, a task delegation and reward/reprimand reinforcement system includes a set of timers and a task completion value system that is transparent for all workers to review. The task completion value system includes a point system, a scoring system, or an advancement system.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

For purposes of the inventive embodiments described in this specification, a lexicography is included here to define some terms and terminology used throughout the description. Specifically, the term "task" refers to work that is to be completed by a worker, such as a human worker, a machine worker, or a robotic worker (hereinafter referred to as a "worker" or a "task worker"). A "task" may involve a single item of work to be completed by a worker or several related work items to be complete by a worker. Additionally, the terms "timer", "timers", "task timer" and other phrases used in association with the term "timer" refer to measurable accounting of time in which a delegated task to be acknowledged and completed. A "timer" can be a physical timer, such as a digital time-keeping device that each worker has, a visible timer, such as a time-keeping application that visually outputs a variety of time-keeping formats, such as countdown timers or limited timers that continuously provide an accurate accounting of time remaining until a delegated task is to be completed. A "timer" can be a worker-assigned timer (such as a worker "task timer"), a supervisory or supervisor timer (such as a supervisory "timer"), or a collective or public timer (such as a "timer" that is visible to all workers, supervisors, and others involved in a collective work effort).

Some embodiments of the invention include novel systems and methods for delegating tasks in a way that increases productivity and morale of workers. In some embodiments, a method for delegating tasks includes transparently and constructively rewarding timely completion of tasks to increase the productivity and the morale of the workers. In some embodiments, the method rewards the timely completion of a set of tasks delegated to a worker by reinforcing a positive work environment and culture. In some embodiments, the method positively reinforces the work environment and culture by awarding task completion value indicators to workers who complete tasks on time. The task completion value indicators include one or more of points, scores, and advancements.

In some embodiments, the task delegation and reward/reprimand reinforcement system includes a set of timers and a task completion value system that is transparent for all workers to review. In some embodiments, the task completion value system includes one or more of a point system, a scoring system, and a merit-based advancement system. The task delegation and reward/reprimand reinforcement system of some embodiments includes a set of timers that allows tasks to be clearly delegated and worked on during a specific time period for completion. In some embodiments, the task delegation and reward/reprimand reinforcement system increases productivity and morale by delegating the clearly defined tasks with the timers. In some embodiments, the timers automatically and constantly remind workers about the tasks, thereby allowing for the rewarding of accurately and timely completed tasks positively with points/scores/advancements, which are constructive and transparent.

In this specification, there are descriptions of processes or methods that are performed by software running on one or more computing devices (e.g., desktop computers, servers, laptops, and mobile computing devices, such as smartphones, tablet computing devices, etc.) which, when running on processes of the computing devices, delegate tasks to workers in a way that increases productivity and morale of workers. However, it should be noted that for the purposes of the embodiments described in this specification, the word "method" is used interchangeably with the word "process". Methods are described, therefore, by reference to example processes that conceptually illustrate process steps for delegating tasks to workers, and process steps for transparently and constructively rewarding timely completion of tasks to increase the productivity and the morale of the workers.

As stated above, people have a tendency to procrastinate, forget about their responsibilities, or often are not sure about the details of their responsibilities even with supervision. The existing and past conventional time management systems do not reward timely completion of tasks positively with points/scores/advancements, which are constructive and transparent. Importantly, the conventional time management systems lacked ways to encourage timely completion of tasks with constructive, transparent feedback in a rewarding, friendly competitive, and fun environment/culture. Also, with the constant bombardment of advertisements/notifications, it is easy to tune out completely. To help keep audience/fans engaged/motivated, the system can offer instant rewards/feedback/competition for audience/fans to any event throughout multiple locations, such as homes, restaurants, bars, etc., if audience/fans can respond correctly and timely, e.g., recall a certain play, song, commercial during the event, etc.

The embodiments described in this specification differ from and improve upon currently existing and past conventional systems or other options. In particular, some embodiments differ by the manner in which tasks are clearly defined to increase productivity and morale of workers. In addition to delegating clearly defined tasks, the system of some embodiments automatically and constantly reminds, with timers, workers assigned to complete tasks about the tasks. The system also rewards accurate and timely completion of tasks positively with rewards. Examples of rewards that are used include points awarded in a point system, scores tallied in a scoring system, and advancements earned in a merit-based advancement system. These positive rewards are also constructive and transparent.

The system and methods described herein also improve upon currently existing and past conventional systems or other options which have not provided rewarding, friendly competitive, and fun environments and/or cultures in order to encourage timely completion of tasks with constructive, transparent feedback. In contrast, the system and methods described in this disclosure create a rewarding, friendly competitive, and fun environment and culture to encourage timely completion of tasks with constructive, transparent feedback.

The system and methods described in this disclosure can be used in any field that requires positive, productive behaviors and to maintain positive, productive behaviors in a rewarding, friendly competitive, and fun environment and culture either with a computer or machine. It can be an addition or a part of a larger system that is accessible by everyone from families to corporations. The system of some embodiments offers instant rewards/feedback for audience/fans in connection with any event throughout multiple locations, such as stadiums, homes, restaurants, etc.

In some embodiments, the system can help with things that human actors or users cannot do well enough to gain a tangible benefit, and which are generally too numerous, too fast for humans, such as sensors, machines, etc. For example, worker machines, autonomous machines, driverless vehicles, unmanned machines and vehicles, drones, sensors, etc., need to process huge amounts of data and respond accurately and timely (e.g., milliseconds). With any minor inaccuracy and/or delay in response time, the system can trigger self-diagnostics/trouble shooting to prevent further mistake.

4b—The system with multiple timers at each and every step with delegation, acknowledgment, completion, verification, reward, competition, re-delegation, etc., can ensure accuracy and prompt response time at every single step throughout multiple locations, factories, on the roads, in the skies, on biological systems (e.g., sensor on human bodies), etc.

Also, in some fields, there are critical needs for accuracy and timeliness in workers who are delegated tasks to complete. In instance, in healthcare there are certain diagnoses (e.g., heart attack, stroke, etc.) that base success on accurate and timely diagnosis to treat the health problem and recover. However, with multiple timers at each and every step with delegation, acknowledgment, completion, verification, reward, competition, re-delegation, etc., the task delegation system can ensure accuracy and shave time at every single step throughout multiple healthcare locations, clinics, ER's, hospitals, etc.

The system and methods of the present disclosure may be comprised of the following elements. This list of possible constituent elements is intended to be exemplary only and it is not intended that this list be used to limit the system of the present application to just these elements. Persons having ordinary skill in the art relevant to the present disclosure may understand there to be equivalent elements that may be substituted within the present disclosure without changing the essential function or operation of the system.

1. A program to assign clearly defined task.
2. To assign timers for completion of each task.
3. To acknowledge receipt and understanding of the details of each task.
4. Once each task is complete, to allow verification of accurate completion.
5. Once accurate task completion is submitted and verified in a timely fashion, reward positively with points/scores/advancements swiftly.
6. If task is not completed accurately in a timely fashion, reprimand with less points/scores, no points/scores, or negative points/scores swiftly. Assign the clearly defined task with increased value to another peer in some embodiments. This will encourage accurate completion of task in a timely fashion by a different peer.
7. To create a rewarding, friendly competitive, and fun environment and culture to encourage timely completion of tasks with constructive, transparent feedback.

The system and methods of the present disclosure unambiguously demonstrate a system that can work to delegate tasks among workers in a way that cannot be done manually but which allows everyone to see the status of delegated work and associated, synchronized timers, and which motivates the workers to accomplish tasks correctly and timely.

Figure 1:
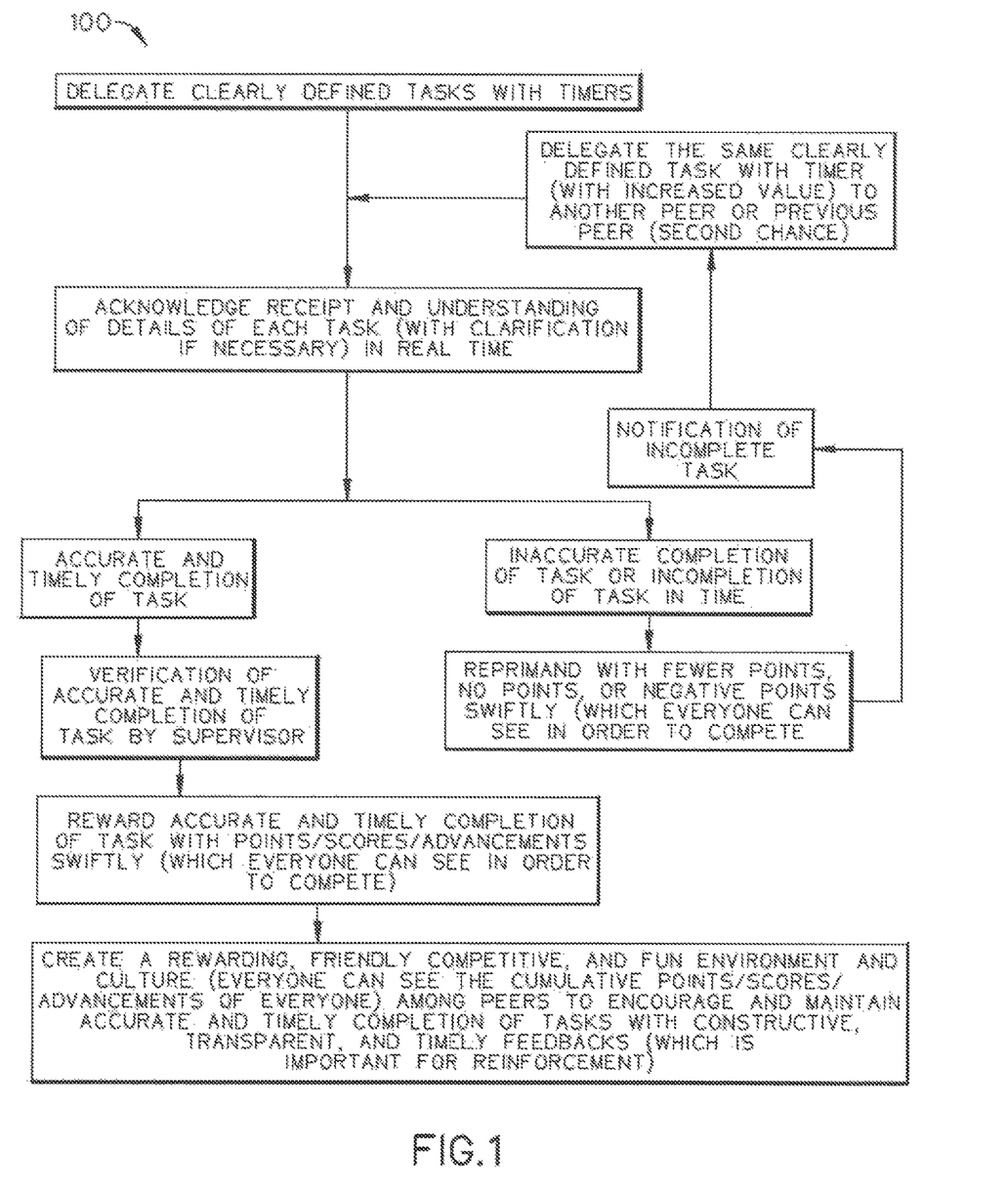
FIG. 1 conceptually illustrates a schematic view of a task delegation system that performs a process in some embodiments for transparently and constructively rewarding timely completion of tasks to increase productively and morale of workers.

By way of example, FIG. 1 conceptually illustrates a schematic view of a task delegation system that performs a process in some embodiments for transparently and constructively rewarding timely completion of tasks to increase productively and morale of workers. As shown in this figure, a process 100 is performed by the task delegation system. In this example, the process 100 includes delegating clearly defined tasks with timers, acknowledging receipt and understanding of details of each task in real time (clarifications made as needed), and then a determination of whether or not a task has been timely and accurately completed. In some embodiment, when the process 100 determines that the task has been accurately and timely completed, the system starts to perform verification of the accuracy and timeliness of the task completion. In some embodiments, a supervisor authenticates and verifies the results. When verification is complete, the process 100 then rewards the accurate and timely completion of the task with points, scores, and/or advancements. This is done swiftly to produce a positive effect on the worker who completed the task. This is also done transparently for all workers to see, thereby allowing all the workers of a team or group to compete with each other. In essence, the process 100 creates a rewarding, friendly competitive, and fun environment and/or culture by the steps above. Since the process is transparent and competitive, all of the workers are able to gauge their productivity against peers, allowing for constructive encouragement to complete tasks accurately and timely.

On the other hand, when the process 100 determines that the task was inaccurately completed or not completed in the specified time period, the process then reprimands by decreasing points, giving no points, giving negative points, etc. This is done swiftly to encourage increased productivity and not to delay re-assignment of the task. This is also done transparently for all workers on the team or in the group to see. The process 100 next notifies of the incomplete/inaccurate task, thereby allowing re-assignment of the task to occur. The process then re-delegates the same clearly defined task with associated timer to another peer for completion. In some embodiments, the rewarded value is increased (i.e., more points, higher scoring, better advancements, etc.). In some embodiments, the worker who failed to timely and/or accurately complete the assigned task will be re-assigned for another try at completing the task. Then the process 100 transitions back to the step of acknowledging receipt and understanding of task details.

The various elements of the system of the present disclosure as presented in the figures and in this Specification may be related in the following exemplary fashion. It is not intended to limit the scope or nature of the relationships between the various elements and the following examples are presented as illustrative examples only. (1) and (2) assign clearly defined tasks with completion timers. (3) acknowledges receipt of each task. Reward positively with points/scores/advancements swiftly only when (4) and (5) are completed accurately in a timely fashion. If (4) and (5) are not completed accurately in a timely fashion, reprimand with points/scores swiftly. (6) If task is not completed accurately in a timely fashion, reprimand with points/scores swiftly. Assign the clearly defined task with increased value to another peer. This will encourage accurate completion of task in a timely fashion by a different peer. (7) To create a rewarding, friendly competitive, and fun environment and culture to encourage timely completion of tasks with constructive, transparent feedback.

The system of the present disclosure generally works by way of a program that (1) assigns clearly defined tasks, (2) assigns timers for completion of each task (3) acknowledges receipt of each task (4) verifies or allows for verification of accurate completion of each task once the task is complete (5) rewards positively and swiftly, once accurate task completion is submitted and verified in a timely fashion, the rewards being one or more of points, scores, or advancements (6) reprimands poor productivity if a task is not completed accurately in a timely fashion by decreasing points or scores or removing prior advancements swiftly, and then re-assigns the clearly defined task with increased value to another peer, thereby encouraging accurate completion of tasks in a timely fashion by a different peer, and (7) creating a rewarding, friendly competitive, and fun environment and culture to encourage timely completion of tasks with constructive, transparent feedback by only rewarding positively with points/scores/advancements when (4) and (5) are completed accurately in a timely fashion, and reprimanding if (4) and (5) are not completed accurately in a timely fashion by swiftly decreasing points or scores or removing advancements.

To make the system of the present disclosure, a person would craft software that is able to complete the requisite tasks and provide the users with the useful tools described here above. In standard practice, all elements work to help encourage positive, productive behaviors and maintain positive, productive behaviors in a rewarding, friendly competitive, and fun environment and culture. In some embodiments, steps (5) and (6) are applied independently for each task.

Additionally, some embodiments of the task delegation system can be used in any field that requires positive, productive behaviors and to maintain positive, productive behaviors in a rewarding, friendly competitive, and fun environment and culture either with a computer or machine.

The task delegation system can be an addition or a part of a larger system that is accessible by everyone from families to corporations.

Several more detailed embodiments are described below. Section I describes a task delegation process and a reward and reprimand reinforcement process. Section II describes conceptual examples of using a task delegation system to motivate workers by rewarding timely and accurate completion of delegated tasks and by reprimanding workers who fail to satisfy delegated task expectations. Lastly, Section III describes an electronic system that implements some embodiments of the invention.

I. Task Delegation Process and Reward and Reprimand Reinforcement Process

Figure 2:
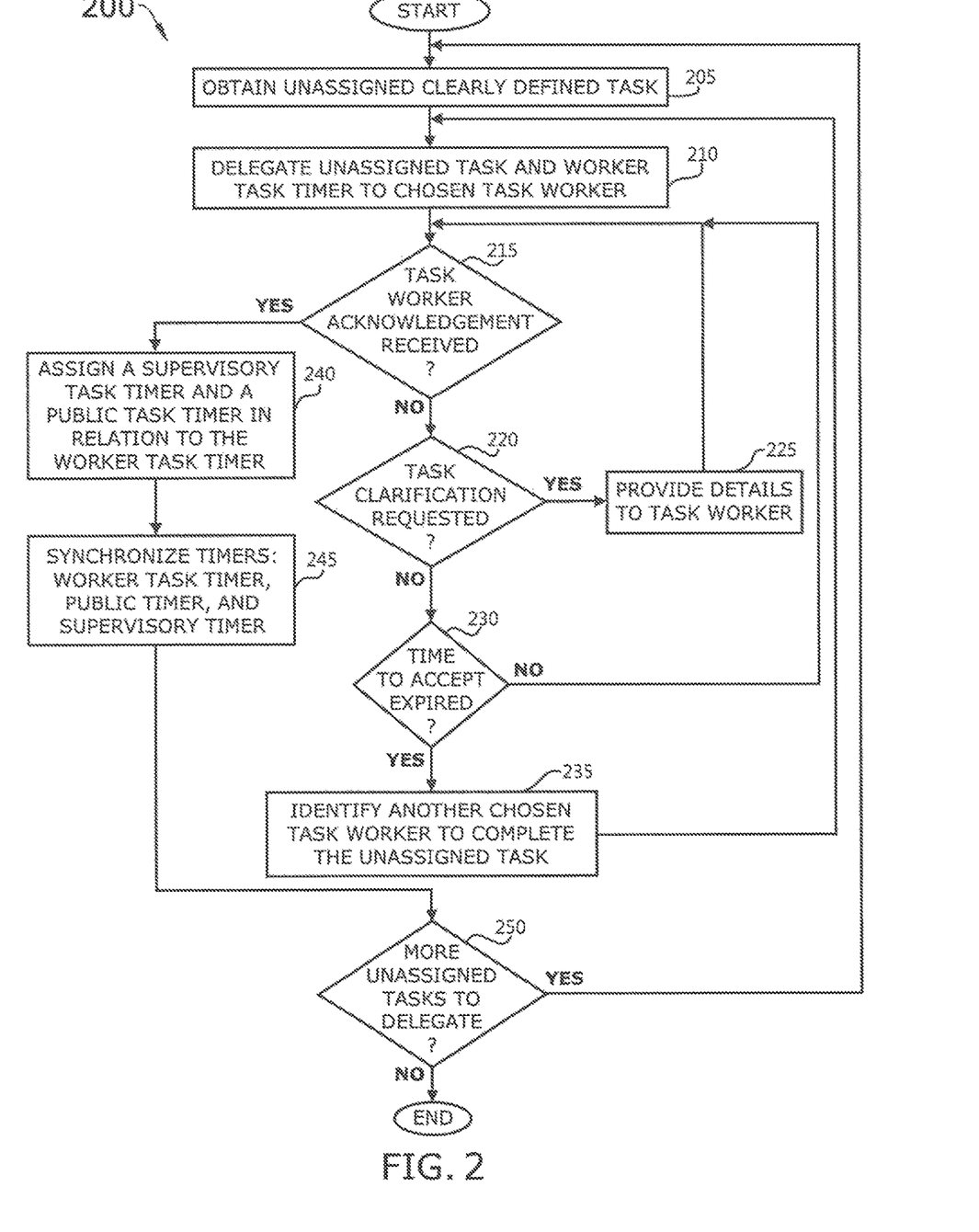
FIG. 2 conceptually illustrates a task delegation process for delegating time-sensitive tasks in a transparent and competitive work environment in some embodiments.

By way of example, FIG. 2 conceptually illustrates a process 200 for delegating time-sensitive tasks in a transparent and competitive work environment. The process 200 for delegating time-sensitive tasks in a transparent and competitive work environment commences when one or more related tasks need to be delegated to workers (task workers). As shown in this figure, the process 200 initially obtains (at 205) an unassigned and clearly defined task (the "unassigned task"). The unassigned task may be related to other assigned or unassigned tasks, which together are related and coordinated tasks of an overall project or work effort. The overall project or work effort may involve multiple human task workers to complete one or more of the tasks that make up the overall project or work effort. The overall project or work effort may also be a time sensitive work project. For example, team coordination is essential and time is critical in some healthcare scenarios (e.g., a heart transplant scenario in which a heart donor is identified and the heart needs to be immediately delivered from the donor in one city to the surgeon in another city).

In some embodiments, the process 200 delegates (at 210) an unassigned task and worker task timer to a chosen task worker. The unassigned task may involve a single work item to be completed by the chosen task worker or several related work items to be completed by the chosen task worker. The worker task timer includes a task completion time which specifies a date, a time, an amount of time, or other timekeeping information related to a time when the task should be completed. After the task is delegated, the process 200 may wait a specified amount of time for the worker to acknowledge receipt of the delegated task.

In some embodiments, after the specified amount of time for acknowledging the task delegation has expired, the process 200 of some embodiments determines (at 215) whether the task worker has acknowledged receiving the task delegation. When the task worker has acknowledged the task delegation, the process 200 moves to step 240 to assign further timers, which is described in greater detail below. On the other hand, when the task worker has not acknowledged the task delegation, the process 200 then determines (at 220) whether task clarification has been requested by the task worker. When task clarification has been requested, the process 200 provides (at 225) details to the task worker to clarify the expectations for completing the task, what is involved in completing the task, resources for further information, and other such clarifying information such that the task worker is prepared to engage in work to complete the task.

On the other hand, when task clarification has not been requested, the process 200 then determines (at 230) whether the time to acknowledge and accept the task has expired. In some embodiments, when a task is delegated to a worker, an acknowledgment and acceptance of the task must be communicated in a certain time frame. For example, in an emergency setting, a worker may be tasked to clean an operating room before delivery of a donated organ which will be transplanted in a patient in need of the organ. However, if the worker engaged in other urgent work that will prevent the operating room from getting cleaned by the time an ambulance with the donated organ arrives, then the time to acknowledge and accept may expire.

In some embodiments, when the time to accept and acknowledge the task has not expired, then the process 200 returns to step 215 to determine whether the worker has acknowledged the delegation of the task. On the other hand, when the time to accept and acknowledge the task has expired, then the process 200 identifies (at 235) another chosen task worker to complete the unassigned task. Then the process 200 returns to step 215 to determine whether this new chosen worker has acknowledged the delegation of the task.

In some embodiments, when the task worker has acknowledged receipt of the delegated task, then the process 200 assigns (at 240) a supervisory task timer and a public task timer in relation to the worker task timer. The supervisory task timer and the public task timer are intended to provide accountability and transparency.

In some embodiments, the process 200 then synchronizes (at 245) all the timers related to the delegated task, including the worker task timer, the public task timer, and the supervisory task timer.

Next, the process 200 of some embodiments determines (at 250) whether there are more unassigned tasks to delegate. For example, in an organ transplant scenario, there may be several tasks to delegate including, without limitation, cleaning and preparing an operating room, delivery of the organ to a suitable location (e.g., hospital operating room), preparing the patient recipient for surgery and bringing to the operating room, providing anesthesia to the patient (e.g., by an anesthesiologist), and performing the organ transplant (e.g., by a surgeon). When there are more unassigned tasks to delegate, the process 200 of some embodiments returns to step 205 to obtain the next unassigned clearly defined task, as described at length above. On the other hand, when there are not more unassigned tasks to delegate, the process 200 then ends.

In some embodiments, the task delegation and reward/reprimand reinforcement system includes a set of timers and a task completion value system that is transparent for all workers to review. In some embodiments, the task completion value system includes one or more of a point system, a scoring system, and a merit-based advancement system. The task delegation and reward/reprimand reinforcement system of some embodiments includes a set of timers that allows tasks to be clearly delegated and worked on during a specific time period for completion. In some embodiments, the task delegation and reward/reprimand reinforcement system increases productivity and morale by delegating the clearly defined tasks with the timers. In some embodiments, the timers automatically and constantly remind workers about the tasks, thereby allowing for the rewarding of accurately and timely completed tasks positively with points/scores/advancements, which are constructive and transparent.

Figure 3:
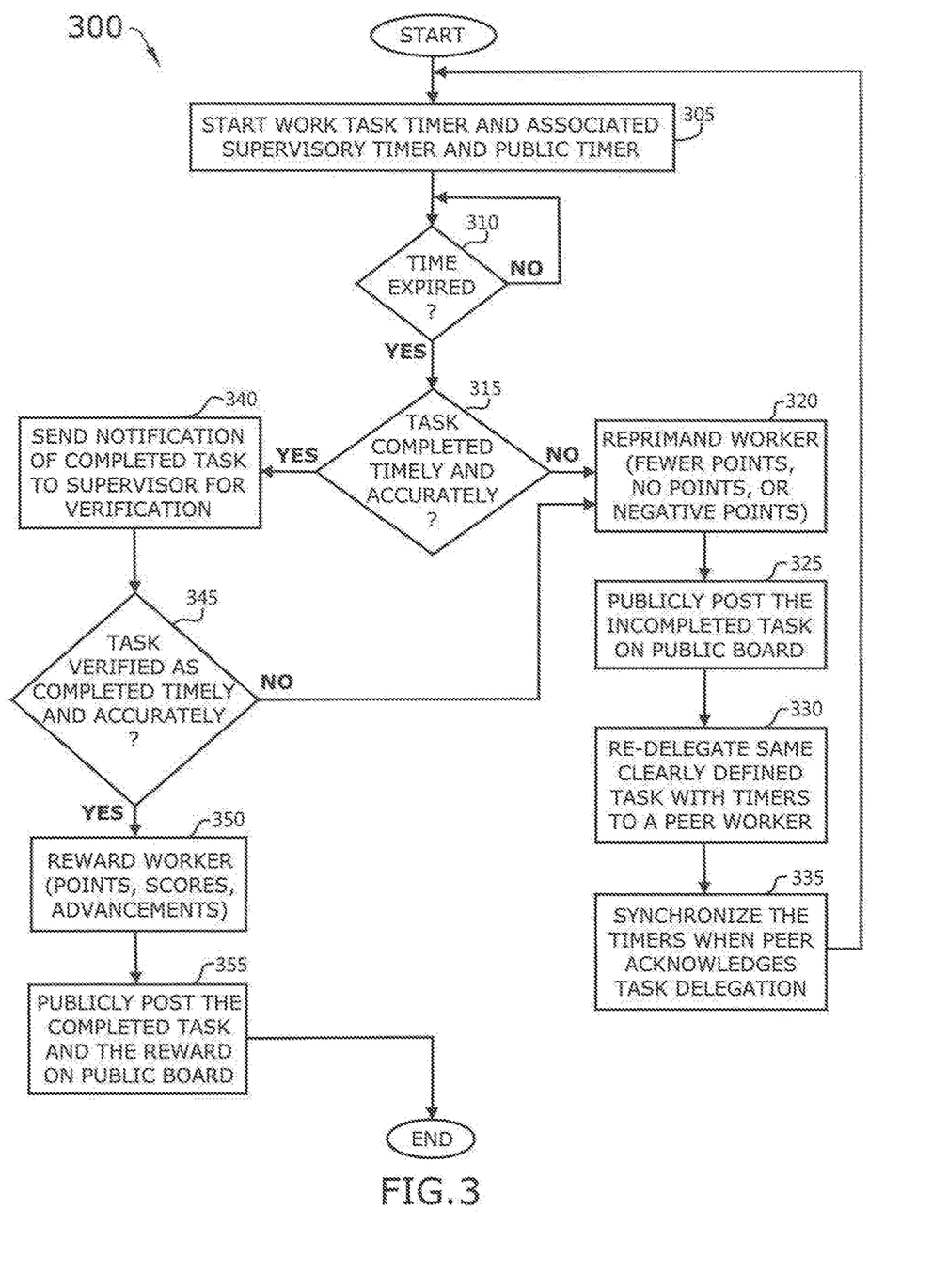
FIG. 3 conceptually illustrates a reward and reprimand reinforcement process for encouraging timely and accurate completion of delegated tasks in a transparent and competitive work environment in some embodiments.

Now turning to another process, FIG. 3 conceptually illustrates a reward and reprimand reinforcement process 300 for encouraging timely and accurate completion of delegated tasks in a transparent and competitive work environment. Some of the steps in the reward and reprimand reinforcement process 300 are described by reference to FIG. 4, which conceptually illustrates a four stages of a time-critical medical scenario spanning multiple floors (multi-level facility) of a medical facility in which several workers are delegated tasks in connection to a human organ transplant and must accurately and timely complete their respective tasks to successfully perform the organ transplant on for an organ recipient (the medical patient). The organ transplant medical scenario presented in this example is successful over the four stages because each of the several workers timely and accurately completed their delegated tasks, thereby enabling a surgeon (the worker delegated the final task) to successfully perform the organ transplant on the medical patient. As shown in this figure, the four stages include a first stage 410, a second stage 420, a third stage 430, and a fourth stage 440. As a person skilled in the relevant art would appreciate, these four stages only provide select glimpses of key moments in the demonstrate the reward and reprimand reinforcement process 300 in the case where all workers perform tasks on time and as expected. Furthermore, the work environment (being a multi-level medical facility) is only one type of work environment in which the reward and reprimand reinforcement process 300 fosters a transparent, competitive, and friendly work environment that rewards timely and accurate completion of tasks by workers. As a person skilled in the relevant art would appreciate, other types of work environments would benefit by using the reward and reprimand reinforcement process 300 to create a transparent, competitive, and friendly work environment that rewards timely and accurate completion of tasks by workers including, without limitation, single floor work environments, multi-building work environments (a hospital or medical facility campus, a university setting, a corporate setting spread over physical space, a sporting or entertainment stadium or venue, etc.), or a multi-room work environment on the same floor or level of the same building (e.g., different wings of a hospital, opposing internal corridors of a stadium, etc.).

Figure 4:
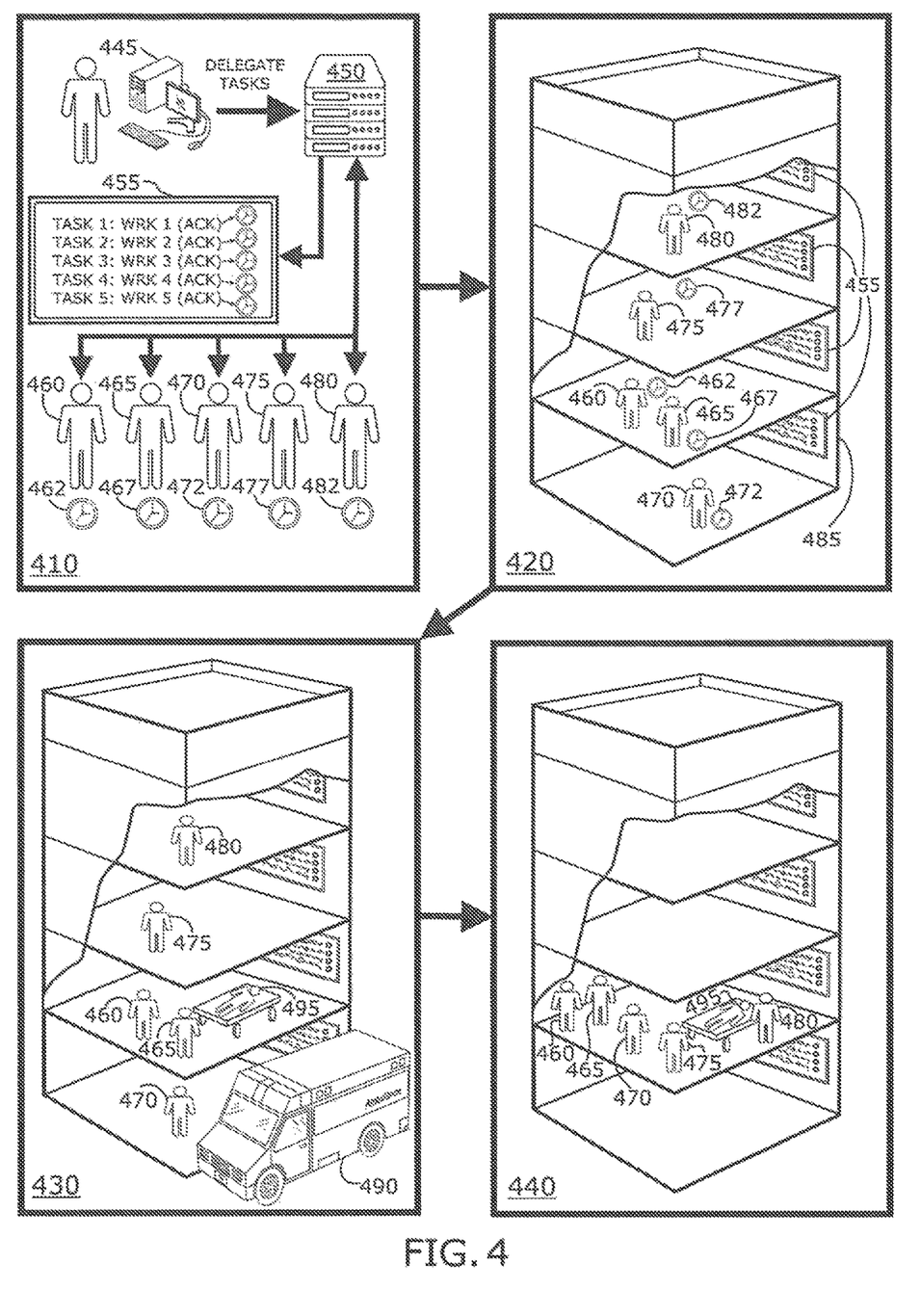
FIG. 4 conceptually illustrates four stages of using a task delegation and reward/reprimand reinforcement system to delegate and carry out time-sensitive tasks in some embodiments.

The time-critical medical scenario shown over the four stages 410-440 of this figure includes a task delegation computing device 445, a task delegation and reward/reprimand reinforcement server 450, an exemplary task monitor screen 455 that transparently displays task status of all delegated tasks for all workers to see as well as timers for the tasks, a plurality of workers who are delegated tasks and assigned timers for the completion of the tasks. Specifically, the plurality of workers includes a first worker 460 assigned a first worker timer 462, a second worker 465 assigned a second worker timer 467, a third worker 470 assigned a third worker timer 472, a fourth worker 475 assigned a fourth worker timer 477, and a fifth worker 480 assigned a fifth worker timer 482. In this example, the first worker 460 has been delegated a first task of cleaning an operating room on a second floor of a hospital 485, the second worker 465 has been delegated a second task of bringing a medical patient 495 to the second floor operating room, the third worker 470 has been delegated a third task of waiting on the first floor of the hospital 485 for an ambulance 490 to deliver the organ to be transplanted into the medical patient 495 (and to bring the organ to the second floor upon delivery), the fourth worker 475 has been delegated a fourth task of anesthetizing the medical patient 495 after the patient and the organ are on the second floor, and the fifth worker 480 (a surgeon) has been delegated a fifth task of performing the organ transplant on the medical patient 495 in the second floor operating room.

As shown on the task monitor screen 455 of the first stage 410, each task is publicly shown with the assigned worker and the status of acknowledgment from the worker, along with a timer showing the expected time to complete the task. Also, each floor of the hospital 485 includes an exemplary task monitor screen 455, each displaying the same task delegation and timer information. Although the hospital 485 shown in this example includes a single task monitor screen 455 for each floor of the hospital 485, the task monitor screen 455 is shown only for illustrative purposes, and not for limitation. Thus, a person skilled in the art would appreciate that there can be multiple task monitor screens 455 at any and all floors of the hospital 485, and that the screens can be any surface that can display a data-driven screen of digital information in connection with delegated tasks and timers. For example, the fifth worker 480 (surgeon) may have an office on the fourth floor of the hospital 485 with a desktop computer and monitor that visually outputs the task monitor screen 455, the fourth worker 475 (anesthesiologist) may be in a third floor cafeteria or another room of the hospital 485 with a mobile device that displays the task monitor screen 455, and each of the first worker 460, second worker 465, and third worker 470 refer to wall-mounted monitors that each display the task monitor screen 455 on their respective floor.

In some embodiments, the task delegation and reward/reprimand reinforcement server 450 includes one or more of a point system to transparently provide points to the task monitor screen 455, a scoring system to transparently display scores in relation to delegated tasks or other quantifiable objective goals, and/or an advancement system to transparently notify others of advancement levels of workers in relation to delegated tasks or other works goals. Thus, the task monitor screen 455 may visually output task completion accuracy and timeliness valuations (e.g., points, scores, measures of advancement, etc.).

Now turning to FIG. 3, the reward and reprimand reinforcement process 300 starts when one or more tasks have been delegated to workers who have, in turn, acknowledged and accepted the delegated task(s). The process 300 includes steps related to a single task delegated to a single worker or single responsible party (which may include two or more workers as a unit). In some embodiments, the reward and reprimand reinforcement process 300 starts (at 305) the worker task timer for the delegated task and the associated supervisory and public timers, which are synchronized with the work task timer. Next, the reward and reprimand reinforcement process 300 determines (at 310) whether the time to complete the delegated task has expired. When the time has not expired, the process 300 returns to the determination (at 310) until the time arrives at which the worker task timer has run out of time for the accurate and timely completion of the delegated task.

In some embodiments, after the time has expired for completing the task, the reward and reprimand reinforcement process 300 determines (at 315) whether the delegated task was completed timely and accurately. When the task is not completed timely and accurately, the process 300 then reprimands (at 320) the worker by scoring fewer points, no points, or negative points to the worker. Next, the reward and reprimand reinforcement process 300 publicly posts (at 325) the incomplete task on the public board.

In some embodiments, the reward and reprimand reinforcement process 300 then re-delegates (at 330) the same clearly defined task with timers to a peer worker. Next, the process 300 synchronizes (at 335) the timers when the peer worker acknowledges and accepts the delegated task and the associated timer. Re-delegating a task and synchronizing task timers are described in detail above, by reference to FIG. 2. After synchronizing the task timers, the reward and reprimand reinforcement process 300 returns to step 305 to start the worker task timer and the associated supervisory timer and public timer, with subsequent steps proceeding as described above.

At some point, the reward and reprimand reinforcement process 300 affirmatively determines (at 315) that the task has been timely and accurately completed. In some embodiments, the process 300 then sends (at 340) a notification of the completed task to the supervisor for verification. In some embodiments, the process 300 then determines (at 345) whether the supervisor verified the task as completed both timely and accurately. When the supervisor determines negatively that the task was not completed either timely or accurately, then the process 300 transitions to step 320 (described above) to reprimand the worker with fewer points, no points, or negative points. The process 300 thereafter proceeds to steps 325, 330, 335, and back to step 305 and forward, as described in greater detail above.

On the other hand, when the reward and reprimand reinforcement process 300 affirmatively determines (at 345) that the task is verified by the supervisor as completed timely and accurately, then the process 300 rewards (at 350) the worker with points, scores, advancements, etc. Next, the reward and reprimand reinforcement process 300 publicly posts (at 355) the completed tasks and the points, scores, advancement, or reward on the public board. Then the reward and reprimand reinforcement process 300 ends.

Referring again to FIG. 4, the stages after the first stage 410 demonstrate successful usage of the task delegation and reward/reprimand reinforcement system. Specifically, at the second stage 420, the hospital 485 is shown in partial cut-away perspective, which reveals four floors or levels (i.e., from the bottom upward: a first floor hospital entry/organ intake location, a second floor operating room, a third floor cafeteria, and a fourth floor surgeon's office). A task monitor screen 455 is shown at each floor, but additional (unseen) task monitor screens maybe present on any/all floors or on desktop/laptop computer monitors, mobile devices, etc. The first worker 460 with first worker timer 462 and the second worker 465 with second worker timer 467 are shown at the second stage 420 to be in the second floor operating room. The first worker 460 was delegated a first task of cleaning and preparing the operating room for organ transplant surgery. The second worker 465 was delegated the second task of bringing the medical patient to the operating room. Since the patient need not be exposed to contaminants while the first worker 460 cleans the operating room, the second worker timer 467 is synchronized with the first worker timer 462 to start near the expected completion time of the first delegated task. Although the second worker 465 is physically positioned nearby the first worker 460 (and could evidently see the progress of cleaning the operating room), the second worker 465 could also be on another floor of the hospital 485, since the second worker 465 could always refer to one of the task monitor screens 455 mounted to the wall at any floor number.

The third worker 470 is shown on the first floor of the hospital 485, waiting for delivery of the organ from the ambulance 490. Since the accurate and timely completion of the third delegated task to the third worker 470 depends on the arrival of the organ by the ambulance, the third worker timer 472 may include an estimate of the time the ambulance 490 is going to arrive. In some embodiments, a task that is delayed at no fault of the worker may be allowed to continue on an extended time period, and all subsequent dependent task timers may then synchronize to the extended time allowed for completion of the delayed task. Thus, while the fourth worker 475 (anesthesiologist) and the fifth worker 480 (surgeon) await the completion of the third task (delivery of the organ), the fourth worker timer 477 and the fifth worker timer 482 may propagate any extended time allocated to for the completion of the third task.

Unlike delivery of an organ, which may be completely out of the control of the third worker 470 whose only job is to wait for the organ delivery on the first floor, if other tasks are in jeopardy or fail to be accurately or timely completed, then instead of extending the time for accurate completion, it is likely that other peer workers would be delegated the failed task of the first worker 460 and/or second worker 465. For example, if the first worker is lagging during the operating room clean-up, and the time expires, the task may be re-delegated to the second worker 465 who is already present on the second floor (or may be re-delegated to another worker). If the second worker 465 is delegated the task from the first worker 460, then the second task may remain delegated to the second worker 465 or may, itself, be re-delegated to another peer worker. Also, since the system encourages accurately and timely completion of delegated tasks, a hospital or another work environment with a lot of activity and personnel who have several known competencies may routinely encounter problems with rigid assignment of tasks because personnel may often be needed in one or another situation which takes them off task for moments or longer. A more fluid and transparent environment would then benefit the overall functioning of the team of workers, who may span multiple floors of a single building, multiple different rooms or wings of a single level building, or multiple different buildings on a single campus or spread over large swaths of physical space (city to city, or county to county, state to state, etc.).

As shown in the third stage 430 of FIG. 4, the ambulance 490 has arrived with the human organ which the third worker 470 on the first floor of the hospital has been waiting for to process the organ for in-take and delivery the organ to the operating room. Also, after the first worker 460 completed the cleanup and preparation of the operating room, the second worker 465 brings the patient 495 into the operating room (shown on a gurney). The third worker 470, after taking control of the organ from the ambulance delivery personnel, will then bring the organ to the second floor operating room to be subsequently transplanted into the medical patient 495 by the surgeon fifth worker 480.

As shown in the fourth stage 440, the third worker 470 is present on the second floor operating room of the hospital 485, having brought the delivered organ to the operating room in preparation for the forthcoming organ transplant procedure on the patient 495. The first worker 460 and the second worker 465, having already completed their tasks, wait on the sideline in this example. However, a person skilled in the relevant art would appreciate that workers who complete their tasks may also depart from the proximity of the ongoing work, so long as they are permitted to leave and do not have follow-up tasks in which to engage and complete. On the other hand, the essential personnel are now fully present in the second floor operating room, with the anesthesiologist fourth worker 475 being present on the second floor to administer anesthesia to the patient 495 before the surgeon fifth worker 480 operates on the patient 495 in the operating room.

Thus, as the example above demonstrates, using the task delegation and reward/reprimand reinforcement system allows all workers delegated one or more tasks to timely and accurately complete their tasks in a competitive and friendly work environment that encourages accuracy and timeliness and motivates workers to meet or exceed task/work expectations.

II. Motivating Workers Via Rewards or Reprimands

The task delegation and reward/reprimand reinforcement system can be used, as noted above, to offer a competitive and friendly work environment that encourages accuracy and timeliness in completing work tasks. However, a further beneficial use of the task delegation and reward/reprimand reinforcement system involves motivational aspects of encouraging workers to meet or exceed task expectations by positive and negative reinforcement mechanisms.

Figure 5:
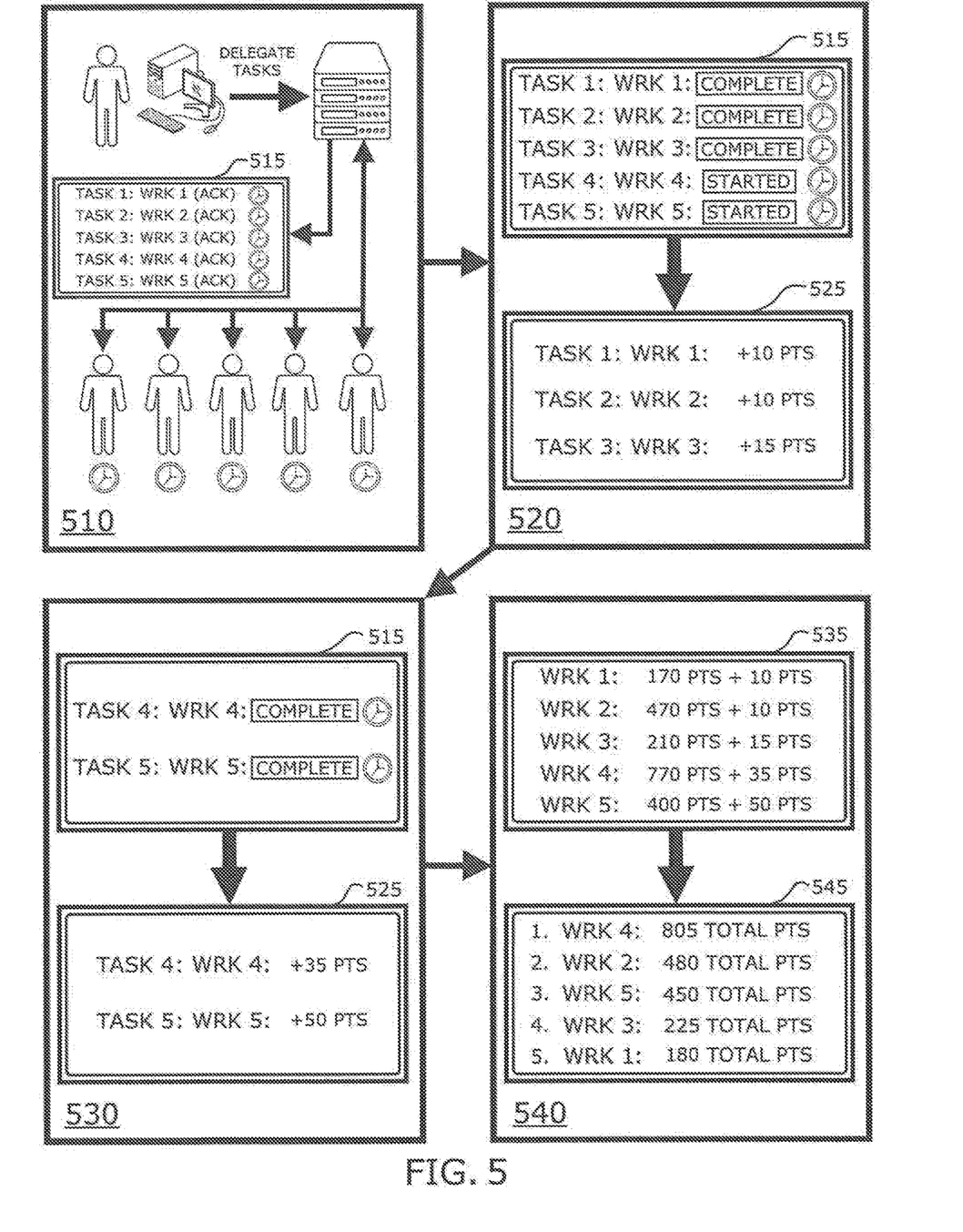
FIG. 5 conceptually illustrates four stages of rewarding timely and accurate completion of a delegated task in some embodiments.

By way of example, FIG. 5 conceptually illustrates four stages of rewarding timely and accurate completion of a delegated task. The four stages include a first stage 510, a second stage 520, a third stage 530, and a fourth stage 540. As shown in the first stage 510, several tasks are delegated by a supervisor to several task workers. The supervisor operates a computing device to delegate the tasks, which are transmitted to the central server for distribution to the workers and publication or display on a public task status board 515. All of the tasks have multiple timers associated with the time expected to complete the task. For example, a worker task timer, a supervisor task timer, and a public task timer are correlated to each delegated task. Prior to any timer starting for a task, all of the timers correlated to a particular task are synchronized so that all users (the assigned worker, the supervisor, and everyone else via the public task status board 515) have accurate timing information in regards to all delegated tasks.

In the second stage 520, the public task status board 515 visually outputs some updated information in regards to the delegated tasks. Specifically, a first task delegated to first worker is shown as being completed, a second task delegated to a second worker is shown as being completed, a third task delegated to a third worker is shown as being completed, a fourth task delegated to a fourth worker is shown as being started, and a fifth task delegated to a fifth worker is shown as being started. In some cases, the delegated tasks and the correlated timers for the tasks may be grouped as task units. In the second stage 520, for example, the first, second, and third tasks may be a task unit in which all of the individual tasks in the task unit must be completed timely and accurately before the fourth task and the fifth task are to be started. Also, since the first, second, and third workers completed their respective tasks timely and accurately, rewards are granted to them. As shown in the second stage 520, and competitive point reward and reprimand board 525 visually outputs positive accruals of points for the workers with completed tasks, namely the first worker with a reward of ten points, the second worker with a reward of ten points, and the third worker with a reward of fifteen points.

In some embodiments, the public task status board 515 and the competitive point reward and reprimand board 525 are separate physical display screens which enable all nearby people to visually obtain information in regards to the status of delegated tasks, and the rewards being earned by workers. In some embodiments, the public task status board 515 and the competitive point reward and reprimand board 525 are part of the same physical display screen which alternately switches between views to visually output (e.g., visually outputting the public task status board 515 until triggered by a point change for at least one worker, at which point the display screen switches to a brief display of the competitive point reward and reprimand board 525, and then back to the public task status board until the next triggering point change).

In the third stage 530, the public task status board 515 visually outputs more updated information in regards to the delegated tasks which have not be completed yet, namely, the fourth task and the fifth task. As displayed on the public task status board 515, the fourth worker has completed the fourth task and the fifth worker has completed the fifth task. Having been completed timely and accurately, the workers are rewarded with points. Specifically, the fourth worker is rewarded with an additional thirty-five points and the fifth worker is rewarded with a fifty point bonus, as shown in the competitive point reward and reprimand board 525.

In the fourth stage 540, a point change summary board 535 visually outputs point value changes for all of the workers who were connected to at least one of the delegated tasks. In this example, all of the workers have increased their point totals. Specifically, the first worker has increased the total number of points (170 points+10 points), the second worker has increased total points (470 points+10 points), the third worker's points increased (210 points+15 points), the fourth worker's points increased (770 points+35 points), and the fifth worker's points increased (400 points+50 points). A reward ranking board 545 visually outputs total points of the workers in a ranked order. Thus, the fourth worker with 805 total points has been able to obtain the most points (to date), with the second worker settling at second rank with 480 total points thus far, the fifth worker in third place so far with 450 total points, the third worker tallying 225 total points for fourth ranked position, and in last place is the first worker with only 180 total points. Depending on how long the reward/reprimand competitive environment allows workers to accrue points, the first worker and all of the workers can continue to increase their total points.

On the other hand, as the workers take on delegated tasks, there are times which they may not be able to timely or accurately complete a delegated task. In such scenarios, the system reprimands (instead of rewarding) the worker with no points, less points, or negative points (reduced from total points). By way of example, FIG. 6 conceptually illustrates four stages of reprimanding failure to satisfy delegated task expectations. The four stages include a first stage 610, a second stage 620, a third stage 630, and a fourth stage 640.

Figure 6:
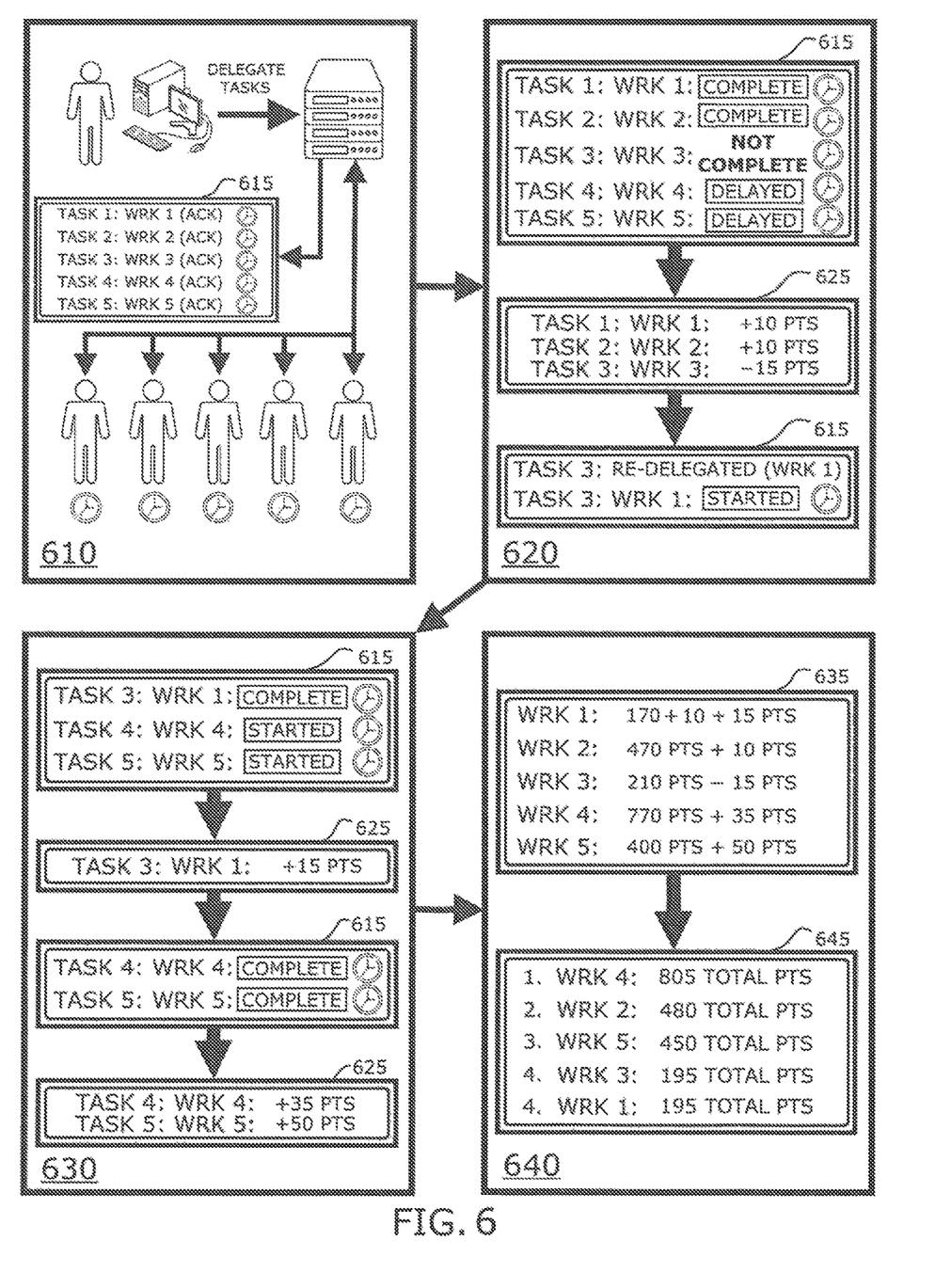
FIG. 6 conceptually illustrates four stages of reprimanding failure to satisfy delegated task expectations in some embodiments.

As shown in the first stage 610, several tasks are delegated by a supervisor to several task workers. These task delegation operations are similar to those described above by reference to the first stage 510 of FIG. 5, as well as the process for delegating time-sensitive tasks in a transparent and competitive work environment of FIG. 2. A public task board 615 is also similar to the public task board 515 of FIG. 5, with all tasks being delegated to specific workers who have acknowledged and accepted the delegated tasks, with the associated timers (worker task timer, supervisor task timer, and public timer for each delegated task) being correlated to their respective task and synchronized with each other (for consistent timing per task).

In the second stage 620, the public task status board 615 visually outputs some updated information in regards to the delegated tasks. Specifically, the first task delegated to the first worker is shown as being completed, the second task delegated to the second worker is shown as being completed, but the third task delegated to the third worker is shown as not being completed. The third task is shown as not completed either because the task was not completed on time or was not completed accurately (or both). As a result of the third task not being completed timely and accurately, any dependent tasks could be delayed. In this example, the fourth and fifth tasks are dependent upon the first, second, and third tasks being timely and accurately completed. Thus, when the third task is not timely and accurately completed, the fourth and fifth tasks get delayed. Accordingly, the public task status board 615 visually outputs a status of "delayed" for each of the fourth task and the fifth task.

In some embodiments, when a task is delayed, all of the timers correlated to the task are reset to ensure that there is time to complete the task. In some cases, an overall project deadline may be jeopardized by resetting the timers of delayed tasks, and therefore, may be adjusted without a complete reset. In other words, if an expected amount of time to complete a task is three hours, but the task gets delayed due to an incomplete dependent task, then the time to complete the task may be reset to only two hours, instead of the original time of three hours. In this way, project deadlines can be maintained with reasonable modifications to account for unexpected task non-completions or inaccuracies.

Also shown in the second stage 620 is the competitive point reward and reprimand board 625 which visually outputs both positive and negative accruals of points. As shown in this example, the first worker is rewarded with a positive accrual of ten points for the timely and accurate completion of the first task and the second worker is rewarded with a positive accrual of ten points for the timely and accurate completion of the second task. However, the third worker is reprimanded with a negative accrual of minus fifteen points for not completing the third task timely or accurately. An update to the delegated third task is thereafter made to the first worker. The public task status board 615 visually outputs this re-delegation of the third task so that everyone can be informed of the personnel assigned to current tasks. Specifically, the public task status board 615 visually outputs the status of the third task as being re-delegated to the first worker, and also shows the status of the correlated timer(s) as being started.

In the third stage 630, the public task status board 615 visually outputs more updated task related information. Specifically, the third task (which was re-delegated to the first worker in the second stage 620) is shown as being completed. That is, after the first worker was assigned the re-delegated third task, the work involved in completing the task was started and completed by the first worker. Upon completion of the third task by the first worker, the fourth task and the fifth task get started with their respective timers synchronized and started. Accordingly, the public task status board 615 visually outputs the updated status of the fourth task (started by the fourth worker) and the fifth task (started by the fifth worker), along with their respective public task timers. One note about the status of the tasks, the status for "started" can include periods of time in which the corresponding task worker is not actually engaged in the work of the task, but preparing for eventual engagement with the task. For example, the fourth worker may be an anesthesiologist who is preparing anesthesia in advance of when it may be needed, and the fifth worker may be a surgeon who is washing hands and putting on surgery scrubs in advance of actually being in the operating room.

Since the third task was completed by the first worker, the competitive point reward and reprimand board 625 visually outputs a point bonus amount for the first worker (e.g., +15 points). Eventually, after the patient is administered anesthesia by the anesthesiologist fourth worker and the surgeon fifth worker has completed the organ transplant, then the status of the fourth and fifth tasks are updated to "completed", as shown on the public task status board 615. The "completed" status, of course, means that the fourth and fifth workers completed their respective tasks timely and accurately. As such, the fourth worker is allotted a bonus of thirty-five points and the fifth worker is granted a fifty point bonus, as shown on the competitive point reward and reprimand board 625.

In the fourth stage 640, the point change summary board 635 visually outputs point value changes for all of the workers who were connected to at least one of the delegated tasks. In this example, all of the workers have increased their point totals. Specifically, the first worker has increased the total number of points (170 points+10 points+15 points), the second worker has increased total points (470 points+10 points), the third worker's points decreased (210 points−15 points), the fourth worker's points increased (770 points+35 points), and the fifth worker's points increased (400 points+50 points). Therefore, the reward ranking board 645 visually outputs total points of the workers in their ranked order, with the fourth worker having accrued 805 total points, the second worker being ranked second with 480 total points thus far, the fifth worker in third place so far with 450 total points, and both the third worker and the first worker racking up 195 total points. This ranking of the workers by total points underscores the friendly competitive spirit in which workers try to perform their tasks. In particular, the system is designed to encourage and motivate workers. This is demonstrated by the eagerness with which the first worker took over the re-delegated third task, ending up gaining fifteen more points than was initially intended.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
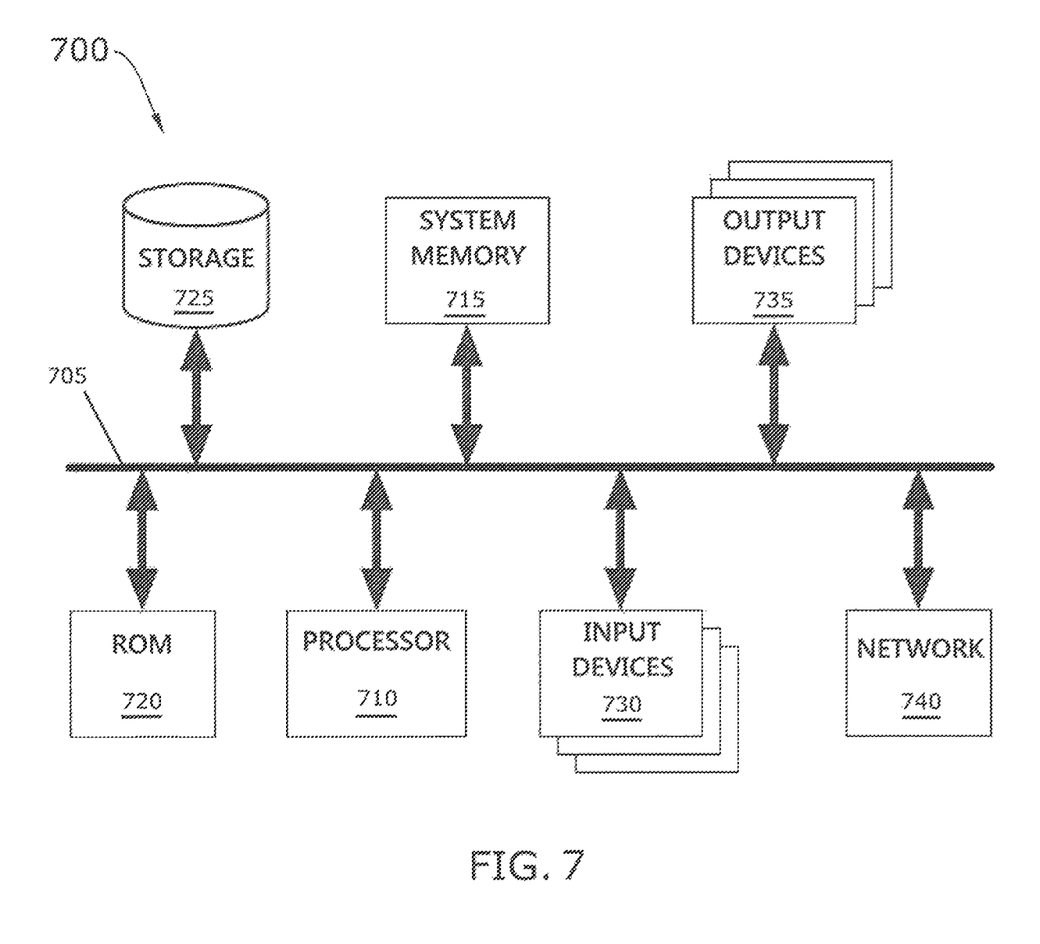
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 2, and 3, conceptually illustrates a schematic of a task delegation system that performs a process for transparently and constructively rewarding timely completion of tasks to increase productively and morale of workers. The specific operations of the process 100 may not be performed in the exact order shown and described. Specific operations may not be performed in one continuous series of operations, and different specific operations may be performed in different embodiments. Furthermore, the process 100 could be implemented using several sub-processes, or as part of a larger macro process. Thus, one of ordinary skill in the art would understand that the invention is not to be limited by the foregoing illustrative details, but rather is to be defined by the appended claims.

I claim:

1. A task delegation system that rewards the timely and accurate completion of delegated tasks to increase productivity and morale of workers, the task delegation system comprising:

a task assignment program for delegating a defined task to a particular worker in a set of team workers, wherein the task assignment program waits to receive at least one of an acknowledgment that the delegated task is accepted by the particular worker and a request for clarification of the delegated task by the particular worker;

a plurality of timers associated with the delegated task, said plurality of timers defining a completion time by which the task is to be accurately completed by the particular worker;

a plurality of public task monitor screens on which the delegated task and the plurality of timers are visually output, wherein the plurality of public task monitor screens are mounted in a plurality of separate rooms;

a positive encouragement system that (i) rewards the particular worker with at least one of points, scores, and advancements when the delegated task is timely and accurately completed, (ii) reprimands the particular worker with at least one of fewer points, no points, and negative points when the delegated task is at least one of not completed timely and not completed accurately, and (iii) visually outputs, onto the plurality of public task monitor screens, a delegated task completion status comprising one of a particular reward status when the delegated task is timely and accurately completed by the particular worker and a particular reprimand status when the delegated task is not timely and accurately completed;

a verification system that evaluates the timeliness and accuracy of any completed task, wherein the verification system sets a task completion status comprising one of (i) a positive task completion status when the delegated task is timely and accurately completed by the particular worker and (ii) a negative task completion status when the delegated task is at least one of not completed timely and not completed accurately; and a re-delegation system that (i) visually outputs the delegated task as an incomplete task onto the plurality of public task monitor screens when the task completion status of the delegated task is the negative task completion status, (ii) triggers the task assignment program to re-delegate the incomplete task as a re-delegated defined task for a peer worker in the set of team workers, and (iii) synchronizes the plurality of timers associated with the re-delegated defined task when the peer worker acknowledges acceptance of the re-delegated defined task.

2. The task delegation system of claim 1, wherein the plurality of timers comprises a worker timer and a public timer, wherein the positive encouragement system is a transparent system in which all workers in the set of team workers can review the task completion status of the delegated task by way of the public timer.

3. The task delegation system of claim 1, wherein the task assignment program delegates a previously-delegated task that was not completed timely and accurately.

4. The task delegation system of claim 3, wherein the particular worker is a first worker in the set of team workers, wherein the task assignment program delegates the previously-delegated task to a second worker in the set of team workers.

5. The task delegation system of claim 1, wherein the positive encouragement system retrieves the task completion status for the delegated task from the verification system and (i) rewards the particular worker with at least one of points, scores, and advancements when the task completion status for the delegated task is the positive task completion status indicating timely and accurate completion of the delegated task and (ii) reprimands the particular worker with at least one of fewer points, no points, and negative points when the task completion status for the delegated task is the negative task completion status indicating at least one of not completed timely and not completed accurately.

6. A non-transitory computer readable medium storing a program which when executed by at least one processing unit of a computing device rewards the timely and accurate completion of delegated tasks to increase productivity and morale of workers, said program comprising sets of instructions for:

delegating a defined task to a particular worker in a set of team workers engaging in work tasks in a plurality of separate rooms;

associating a plurality of timers with the delegated task, said plurality of timers defining a completion time by which the task is to be accurately completed by the particular worker;

receiving an acknowledgment that the delegated task is accepted by the particular worker;

visually outputting the delegated task and a timer from the plurality of timers onto a plurality of task monitor screens, wherein each task monitor screen is mounted in a different room of the plurality of separate rooms;

performing one of a task reward evaluation and a task reprimand evaluation based on an accuracy and timeliness determination for the delegated task, wherein the task reward evaluation is performed when the delegated task is accurately completed by the particular worker within the defined completion time and the task reprimand evaluation is performed when the delegated task is at least one of not accurately completed by the particular worker and not completed within the defined completion time by the particular worker;

rewarding the particular worker when the task reward evaluation is performed; and reprimanding the particular worker when the task reprimand evaluation is performed.

7. The non-transitory computer readable medium of claim 6, wherein the plurality of timers associated with the delegated task comprises a worker timer for the particular worker and a plurality of public timers that are visually output along with the delegated task onto the plurality of task monitor screens in different rooms for visibility by the set of team workers.

8. The non-transitory computer readable medium of claim 7, wherein the program further comprises a set of instructions for synchronizing time to complete the delegated task for the worker timer and the plurality of public timers, wherein the synchronized time is visually output in realtime and onto the plurality of task monitor screens simultaneously in the different rooms.

9. The non-transitory computer readable medium of claim 7, wherein the plurality of separate rooms comprise a first room on a first floor of a building and a second room on a second floor of the building, wherein a specific worker among all of the workers in the set of team workers is engaged in a first work task in the first room on the first floor until the public timer in the first room on the first floor displays a particular time, wherein the specific worker stops engaging in the first work task in the first room on the first floor and starts engaging in a second work task in the second room on the second floor after the particular time is displayed for the public timer visually output onto the task monitor screen in the first room on the first floor.

10. The non-transitory computer readable medium of claim 9, wherein the program further comprises a set of instructions for posting rewards and reprimands of all workers in the set of team workers associated with all tasks on each task monitor screen of the plurality of task monitor screens that are mounted in the plurality of separate rooms.

11. The non-transitory computer readable medium of claim 6, wherein the set of instructions for rewarding the particular worker comprises a set of instructions for positively awarding the particular worker upon completion of the task reward evaluation with one of a score, a set of points, and an advancement.

12. The non-transitory computer readable medium of claim 6, wherein the set of instructions for reprimanding the particular worker comprises a set of instructions for reprimanding the particular worker upon completion of the task reprimand evaluation with one of a set of negative points, an empty set of no points, and a set of reduced points.

\* \* \* \* \*